Nov. 28, 1933.  C. J. KING  1,936,763
REGULATOR
Filed Sept. 21, 1931   2 Sheets-Sheet 1
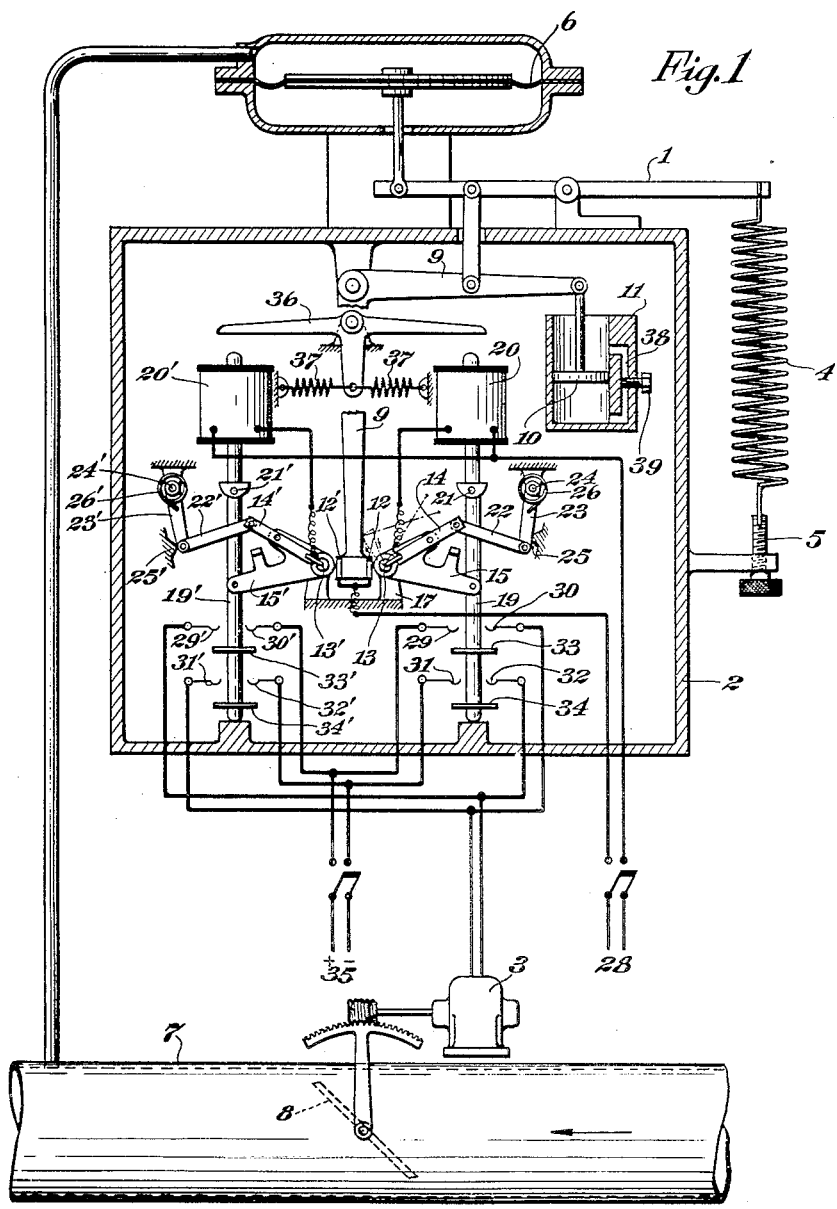
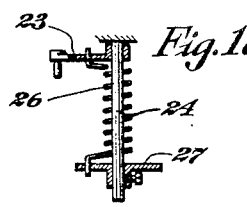
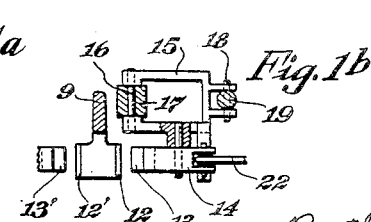
INVENTOR
Cyril J. King,
BY
Bartlett, Eyre, Scott & Keel
ATTORNEYS

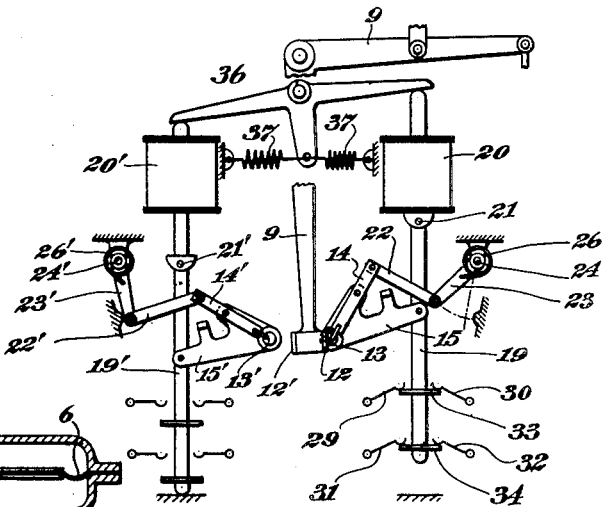
Nov. 28, 1933.  C. J. KING  1,936,763
REGULATOR
Filed Sept. 21, 1931   2 Sheets-Sheet 2

Patented Nov. 28, 1933

1,936,763

UNITED STATES PATENT OFFICE 1,936,763

REGULATOR

Cyril J. King, Flushing, N. Y., assignor to Smoot Engineering Company, New York, N. Y., a corporation of Delaware Application September 21, 1931
Serial No. 564,019

12 Claims. (Cl. 172—239)

The present invention relates to the art of regulation and comprises an improved electric regulator of simple and rugged construction adapted to control the length of period of energization and the interval therebetween of a reversible electric motor in response to the departure from a desired value of a function of the positon of the element moved directly or indirectly by the motor. The regulator is so constructed as to permit of ready adjustment of the rapidity of response and of the length of period through which the motor will be energized in one direction or the other for a given departure from the desired value of the function of the controlled element.

For an understanding of the invention reference may be had to the accompanying drawings of which:

Fig. 1 is a sectional view of the complete regulator illustrated as controlling a damper to maintain constant the fluid pressure in a conduit;

Fig. 1a is a horizontal sectional view of a portion of the regulator of Fig. 1;

Fig. 1b is a plan view partly in section of another portion of the regulator illustrating the contact making devices;

Figs. 2 and 3 are similar views of a portion of the regulator illustrating various steps in the operation thereof; and Fig. 4 is a fragmentary view illustrating a modified form of a portion of the regulator for increasing the range of adjustment of the period of energization of the motor.

Referring to the drawings, the regulator includes a pivoted balance lever 1 mounted upon a casing 2 containing the contact making devices for the reversible electric motor 3 to be controlled. A spring 4 attached to one end of the lever 1 and having its tension adjustable by a screw 5 threaded into a bracket mounted on the casing 2 applies a fixed loading force to the lever 1 in opposition to the pressure acting upon a diaphragm 6 rigidly attached to the other end of lever 1. In the specific application of the invention illustrated, the pressure acting upon diaphragm 6 is that in a conduit 7 through which the flow of fluid is controlled by the position of a damper 8 adjustable by the motor 3. The particular forces acting upon lever 1 are immaterial to the present invention. The spring 4 could be replaced by any desired constant or variable controlling force and the opposing force could be any force suitably varying as a function of the position of the controlled element.

Mounted within casing 2 for rotation about a horizontal axis is a bell crank lever 9 the horizontal arm of which is linked to lever 1 and carries the movable member 10 of a dashpot 11 and the vertical arm of which carries on a forwardy projecting portion thereof a pair of contacts 12 and 12'. (Figs. 1 and 1b). Contact 12 upon a counted clockwise rotation of lever 9 engages a contact 13 and contact 12' upon rocking of lever 9 in the other direction, engages a contact 13'. Similar mechanisms are associated with contacts 13 and 13', and, as corresponding elements are indicated with like reference numerals except that a prime is attached to those of the mechanisms associated with contact 13', a description of the mechanism associated with contact 13 will be sufficient. Contact 13 is carried on the end of a movable member 14, which is pivotally mounted on an upwardly projecting portion of a yoke member 15. Yoke member 15 is mounted on a horizontal rod 16 which passes through a cylindrical aperture in a fixed support 17 and through aligned apertures in the arms of the yoke member so to permit of rotation of member 15 about the rod 16 as an axis. The end of yoke member 15 remote from rod 16 is linked by a pin 18 to a vertical rod 19. An electroresponsive device 20 is associated with rod 19 and when energized operates to lift the rod 19 and to thereby rock yoke member 15 about the rod 16; a joint 21 being provided to insure sufficient sideways motion of the rod 19 to prevent jamming of the yoke member. Member 14, at the end remote from contact 13, is linked to a toggle arm 22 to the end of which an arm 23 is linked. Arm 23 is rotatably mounted on a rigidly mounted horizontal shaft 24, (see Fig. 1a), and is biased into engagement with a stop 25 by a spring 26 coiled about the shaft 24. One end of spring 26 is connected to the arm 23 and the other end is fastened to a member 27 so keyed to the shaft 24 as to permit of adjustment of the tension of the spring.

With the above described arrangement upward movement of rod 19 occasioned by energization of magnet 20 followed by return of rod 19 to its initial position causes contact 13 to follow a closed path indicated in dotted lines in Fig. 1; intermediate positions of the contact mechanism being illustrated in Figs. 2 and 3, and hereinafter more fully described.

Contacts 12 and 12' are connected to one side of any suitable source of electromotive force, indicated by the power lines 28. Contact 1" is connected with one terminal of device 20; the other terminal of the device being connected to the other side of the power lines 28. The circuit for device 20 is thus closed when lever 9 rocks in a direction to bring contact 12 into engagement with contact 13. Similarly when lever 9 rocks in a direction to bring contact 12' into engagement with contact 13' electro-responsive device 20' is energized, lifting rod 19' and thereby rocking yoke member 15'. When rod 19 is raised, it operates to close the circuit of motor 3 by bridging two pair of fixed contacts 29, 30 and 31, 32, with conducting cross pieces 33 and 34 respectively; contacts 29 and 31 being connected across a suitable source of direct voltage indicated at 35 and contacts 30 and 32 being connected to the terminals of motor 3. Similar pairs of fixed contacts 29', 30' and 31', 32' cooperate with cross pieces 33' and 34' on rod 19', when that rod is raised, to close the circuit of motor 3 in the opposite direction. A pivoted cross bar 36 biased by springs 37 toward horizontal position serves to aid in returning arms 19 and 19' to normal position upon deenergization of the respective electroresponsive device controlling the same and serves also, during energization of one or the other of devices 20 and 20' to hold the rod associated with the other device against vibration.

In operation of the regulator, should the pressure in conduit 7 be lower than that for which spring 4 is adjusted, indicating too small a flow through the conduit, the balance of forces upon lever 1 is disturbed causing a slight clockwise rotation thereof and a corresponding rocking of bell crank lever 9 in a direction to close contacts 12 and 13 as shown in Fig. 2. Device 20 thereupon becomes energized and raises rod 19 into position to close the circuit of motor 3 in a direction to open damper 8. The upward movement of rod 19 rocks member 15 about the horizontal rod 16 and, as the pivot point of member 14 is moved thereby, the spring 26 forces contact 13 firmly against contact 12, thus increasing the pressure betwen the contacts during upward movement of rod 19. The pressure between the contacts introduced by spring 26 serves, when the upper limit of travel of rod 19 has been reached, to return lever 9 to neutral position; contact 13 then snapping over contact 12 into the position shown in Fig. 3 and opening the circuit of device 20. Cross bar 36, under the influence of spring 37, then aids gravity in insuring return of rod 19 to initial position. Due to the linkage connections of members 14, 22 and 23, and the rocking of yoke member 15, contact 13, in returning to initial position, follows a slightly different path than that it traverses in leaving its initial position and thus avoids, during its return motion, any possible reclosing of the circuit of device 20.

This general arrangement permits of considerable adjustment and gives a length of actuator contact varying approximately with the amount by which the pressure on diaphragm 7 departs from the desired value; the greater the departure of the pressure the longer is the actuator contact maintained, since the greater is the unbalance of forces upon lever 1 and consequently the greater is the differential force opposing the return of lever 9 by spring 26. Furthermore, a very slight unbalance on lever 1 will take a considerable length of time to move the lever 9 into contact making position, as well as a shorter time for its return. Thus the intervals between successive contacts become longer and the length of contact becomes shorter as the unbalance between controlled and controlling forces become less. Thus the regulator varies the time of operation of the actuating motor with the magnitude of the error to be corrected.

To permit of a wide range of adjustment, not only is the tension of springs 26 and 26' made adjustable, as heretofore indicated, but also the retarding force introduced by the dash pot 11 is made adjustable by the provision of a by-pass 38 about the piston 10 controlled by an adjustable throttle valve 39. Increase of the resistance to flow through by-pass 38 for example increases the interval between successive contacts while increase in the tension of springs 26 and 26' reduces the length of contacts.

If a relatively short period of energization is desired, the arrangement illustrated in Fig. 4 may be advantageously employed. With this arrangement the dash pot 11 is provided with an additional by-pass about the movable member controlled by two valves, 40 and 41, in series. Valve 40 is manually adjustable and would ordinarily be set to permit fairly rapid equalization of pressures across piston 10. Valve 41 is automatically operated to maintain the by-pass closed except when one or the other of rods 19 and 19' is in its uppermost position due to energization of one or the other of devices 20 and 20'. For this purpose valve 41 is carried by an arm 42 to which it is linked and which is rigidly mounted on a shaft 43. Shaft 43 which is mounted in fixed bearings 44 for rotation about a horizontal axis, carries additional arms 45 and 45' adapted to be engaged by opposite ends of the cross bar 36 to be rocked thereby whenever bar 36 is rocked about its axis due to upward movement of one or the other of rods 19 and 19'. With this arrangement the rapid equalization of the pressures acting across piston 10 when valve 41 is raised reduces the force upon lever 9 opposing restoration thereof to normal position and thus shortens the period of energization without reducing the interval between successive energizations of the motor for, when the motor 3 is deenergized, valve 41 closes the additional by-pass about piston 10.

One embodiment of the invention and a modification of a portion thereof has now been described. Obviously many changes could be made and various parts could be omitted without departure from the spirit of the invention.

The following is claimed:

1. A regulator comprising in combination an element to be controlled, a reversible electric motor adapted, when energized, to control the position of the element, a balance lever responsive to a controlling force and to a force varying as a function of the position of said element, an electroresponsive device adapted when energized to cause closure of the circuit of said motor in one direction, a second electroresponsive device adapted when energized to close the circuit of said motor in the other direction, a member connected with said lever adapted when displaced from neutral position in one direction or the other to cause energization of one or the other of said devices, and adjustable means associated with said devices for creating a force tending to return said member to neutral position after energization of one or the other of said devices.

2. A regulator according to claim 1 including adjustable means for delaying movement of said lever in response to an unbalance of the forces acting thereupon.

3. A regulator according to claim 1 including a dash pot, a piston movable therein and carried by said member, said dash pot having a pair of passages therein by-passing said piston, a valve controlling one of said passages, and means operated upon energization of one or the other of said devices for moving said valve to open the passage controlled thereby to reduce the period of energization of said motor.

4. In a regulator of the type wherein a controlling force and a force varying as a function of the element controlled act upon a balance which, upon departure from neutral effects the control of the element through auxiliary electrical power means, the combination comprising an electroresponsive device adapted when energized to cause said power means to move said element in one direction, a switch arm movable by said balance upon departure from neutral position, a contact adapted to be engaged by said arm when said arm is displaced in one direction by said balance and, when engaged, to close the circuit for said device, and a flipper mechanism associated with said contact and with means controlled by said device for forcing said contact against said arm to return the same to neutral position; said flipper mechanism causing said contact to snap past the engaging portion of said arm and to return to initial position without reengaging the same.

5. The combination according to claim 4 wherein said flipper mechanism includes a coiled spring the tension of which causes the snap action thereof and wherein means are provided for adjusting the tension of said spring to adjust the period of energization of said device.

6. The combination according to claim 4 including means for varying the interval between successive energizations of said device, said means including a dash pot having the movable member thereof carried by said arm and provided with an adjustable by pass about the movable member thereof.

7. The combination according to claim 4 including a second electroresponsive device adapted, when energized, to cause said power means to move said element in the other direction, a second contact adapted to be engaged by said arm upon displacement thereof in the other direction, and, when engaged, to cause energization of said second device, and a second flipper mechanism associated with said second contact and with means controlled by said second device, for forcing said second contact against said arm to return the same to neutral position, said second flipper mechanism likewise causing said second contact to snap past the engaging portion of said arm and to return to initial position without reengaging the same.

8. In a regulating mechanism adapted to control the position of an element, the combination comprising a reversible electric motor for moving the element in one direction or another, a longitudinally movable rod adapted in operative position to close the circuit of said motor to cause operation thereof in one direction, an electroresponsive device adapted when energized to move said rod from inoperative to operative position, a deflecting member adapted to be deflected from neutral position upon departure from balance of a controlling force and a force varying as a function of the element controlled, a contact member adapted to be engaged by said deflecting member when said deflecting member departs in one direction from neutral position and when engaged to close the circuit of said device, a yoke member upon which said contact member is pivoted and which is linked to said rod and rockable about a fixed axis, and a train of levers linked to said contact member and spring biased toward a predetermined position, said fixed levers together with said contact member forming a flipper mechanism for returning said deflecting member to neutral position after said rod has reached its operative position due to energization of said device.

9. The combination according to claim 8 including means for adjusting the spring biasing of said levers.

10. The combination according to claim 8 including adjustable means for delaying deflection of said deflecting member upon departure of balance between the controlling force and the force varying as a function of the element controlled.

11. In a regulating mechanism adapted to control the position of an element, the combination comprising a reversible electric motor adapted when energized in one direction or the other to cause movement of the element in one direction or another, a balance lever movable from neutral position upon an unbalance between a controlling force and a force varying as a function of the controlled element, an electroresponsive device adapted when energized to cause said motor to move said element in one direction, a switch arm movable by said balance upon departure from neutral position, adjustable means associated with said arm for delaying movement thereof, a contact adapted to be engaged by said arm when said arm is displaced in one direction by said balance and when engaged to close the circuit for said device and a flipper mechanism associated with said contact and with means controlled by said device for forcing said contact against said arm to return the same to neutral position; said flipper mechanism including means for adjusting the force exerted on said arm by said contact and when operated causing said contact to snap past the engaging portion of said arm and to return to initial position without reengaging the same.

12. A regulator according to claim 1 including a dash pot, a piston movable therein and carried by said member, said dash pot having a passage therein by-passing said piston, a valve controlling said passage, and means operated upon energization of one or the other of said devices for moving said valve to open the passage controlled thereby to reduce the period of energization of said motor.

CYRIL J. KING.